United States Patent
Tomita et al.

(10) Patent No.: US 6,913,115 B2
(45) Date of Patent: Jul. 5, 2005

(54) FLUID PRESSURE-OPERATED APPARATUS-CONNECTING DEVICE

(75) Inventors: Taku Tomita, Katsushika-ku (JP);
Takehiko Kanazawa, Kashiwa (JP);
Mitsutoshi Araki, Tsukuba-gun (JP);
Toshiharu Wada, Tsukuba (JP);
Makoto Wada, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 272 days.

(21) Appl. No.: 10/190,076

(22) Filed: Jul. 6, 2002

(65) Prior Publication Data

US 2003/0006097 A1 Jan. 9, 2003

(30) Foreign Application Priority Data

Jul. 6, 2001 (JP) ........................................ 2001-207014

(51) Int. Cl.[7] .............................. F16N 7/30; F16L 3/00; F16L 41/06
(52) U.S. Cl. ........................ 184/55.2; 285/61; 285/125.1
(58) Field of Search ........................... 184/6.21, 6.24, 184/6.26, 55.1, 55.2, 57, 58, 59; 285/61, 64, 125.1, 363

(56) References Cited

U.S. PATENT DOCUMENTS

| | | | |
|---|---|---|---|
| 3,559,764 A | * | 2/1971 | Wheeler, Jr. ............... 184/55.2 |
| 4,070,045 A | * | 1/1978 | Colter et al. ................ 285/325 |
| 4,289,335 A | * | 9/1981 | Olbermann ................... 285/91 |
| 4,352,511 A | * | 10/1982 | Ribble et al. ................. 285/91 |
| 4,533,020 A | | 8/1985 | Yamazaki ................... 184/55.2 |
| 5,372,392 A | | 12/1994 | Dunn et al. |

FOREIGN PATENT DOCUMENTS

| | | |
|---|---|---|
| DE | 201 06 366 U1 | 9/2001 |
| EP | 0 261 711 A2 | 3/1988 |
| FR | 2 470 912 | 6/1981 |
| GB | 2 279 419 A | 1/1995 |
| JP | 61-36868 | 10/1986 |

* cited by examiner

Primary Examiner—Chong H. Kim
(74) Attorney, Agent, or Firm—Paul A. Guss (57) ABSTRACT

A fluid pressure-operated apparatus-connecting device comprises a body to which an O-ring is installed, a bracket which is connected to the body, a fastening member which is connected to the body, a plate spring which is interposed between the body and the fastening member, a pin member which is engaged with a second engaging groove to fasten the fastening member thereby, and a bolt which integrally fixes the body, the bracket, and the fastening member.

15 Claims, 10 Drawing Sheets

FLUID PRESSURE-OPERATED APPARATUS-CONNECTING DEVICE

BACKGROUND OF THE INVENTION

1. Field of the Invention

The present invention relates to a fluid pressure-operated apparatus-connecting device capable of making communication between fluid passages of a plurality of fluid pressure-operated apparatuses by connecting, in parallel, the plurality of fluid pressure-operated apparatuses of the same type or different types including, for example, filters, regulators, and lubricators.

2. Description of the Related Art

The present applicant has already proposed a connecting mechanism for making integrated connection for a three-piece set including a filter, a regulator, and a lubricator to be used for a pneumatic pressure circuit (see Japanese Utility Model Publication No. 61-36868).

Figure 10:
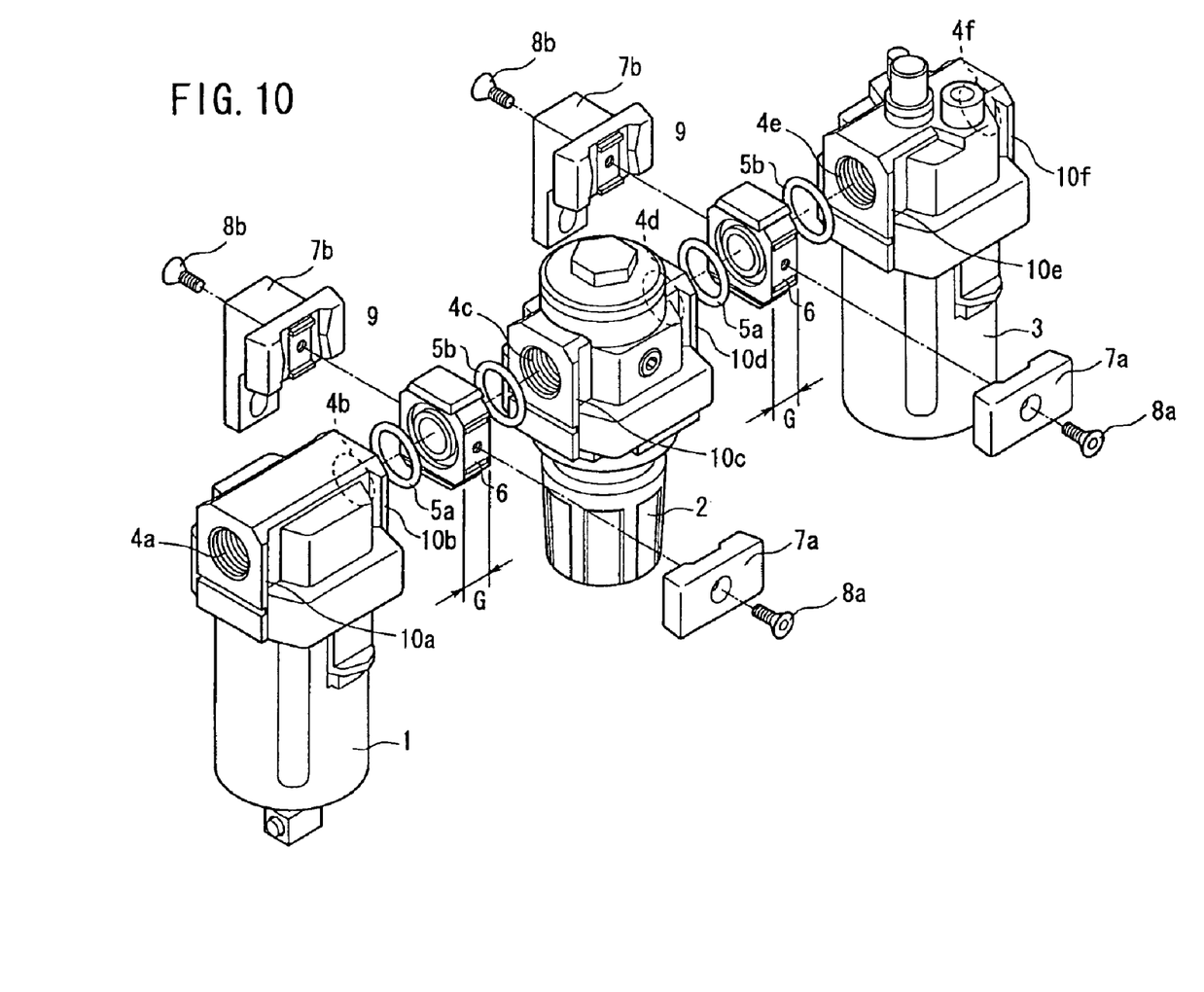
FIG. 10 is an exploded perspective view illustrating a fluid pressure-operated unit including a connecting mechanism previously devised by the present applicant.

As shown in FIG. 10, the connecting mechanism integrally connects the three types of fluid pressure-operated apparatuses including the filter 1 for removing dust contained in a pressure fluid, the regulator 2 for adjusting the pressure value of the pressure fluid, and the lubricator 3 for spraying a lubricating oil in the pressure fluid so that the pressure fluid contains the lubricating oil in order to lubricate an apparatus or the like for which lubrication is required. When the fluid pressure-operated apparatuses are connected, a spacer 6, to which a pair of O-rings 5a, 5b are installed, are interposed between ports 4b, 4c of one fluid pressure-operated apparatus (for example, filter 1) and the other fluid pressure-operated apparatus (for example, regulator 2) which are disposed adjacently. The spacer 6 and the two parts (filter 1 and regulator 2) are fastened by a pair of fixing fixtures 7a, 7b on the both sides, and they are integrally connected by means of two screw members 8a, 8b. After that, the remaining one part, i.e., the lubricator 3 is connected in the same manner to an assembled fluid pressure-operated apparatus in which the two parts, i.e., the filter 1 and the regulator 2 have been already integrated into one unit. Thus, the three parts (filter 1, regulator 2, and lubricator 3) are integrated into one unit.

The connecting mechanism will be explained in more detail below. When one and the other fluid pressure-operated apparatuses are connected to one another, an operator firstly grips the one and the other fluid pressure-operated apparatuses which are disposed adjacently and which are to be connected. The spacer 6 is interposed and retained between the one and the other fluid pressure-operated apparatuses. After that, the fixing fixtures 7a, 7b are engaged with projections 10b, 10c which are disposed near the ports 4b, 4c of the fluid pressure-operated apparatuses, and they are fixed by means of the two screw members 8a, 8b. Thus, the fluid pressure-operated apparatuses are connected to one another.

Subsequently, when the remaining one part is connected to the two fluid pressure-operated apparatuses having been already connected, the operation is performed in the same manner as described above. That is, the spacer 6 is interposed and retained between the both in a state in which the remaining one part and the two fluid pressure-operated apparatuses having been already connected are gripped. After that, the fixing fixtures 7a, 7b are engaged with projections 10d, 10e which are disposed near the ports 4d, 4e of the fluid pressure-operated apparatuses, and they are fixed by means of the two screw members 8a, 8b. Thus, the plurality of fluid pressure-operated apparatuses are connected to one another.

SUMMARY OF THE INVENTION

A general object of the present invention is to provide a fluid pressure-operated apparatus-connecting device with which an operator can smoothly perform the connecting operation without gripping respective fluid pressure-operated apparatuses when the fluid pressure-operated apparatuses are connected to one another, and the operation for connecting the respective fluid pressure-operated apparatuses can be performed more conveniently.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
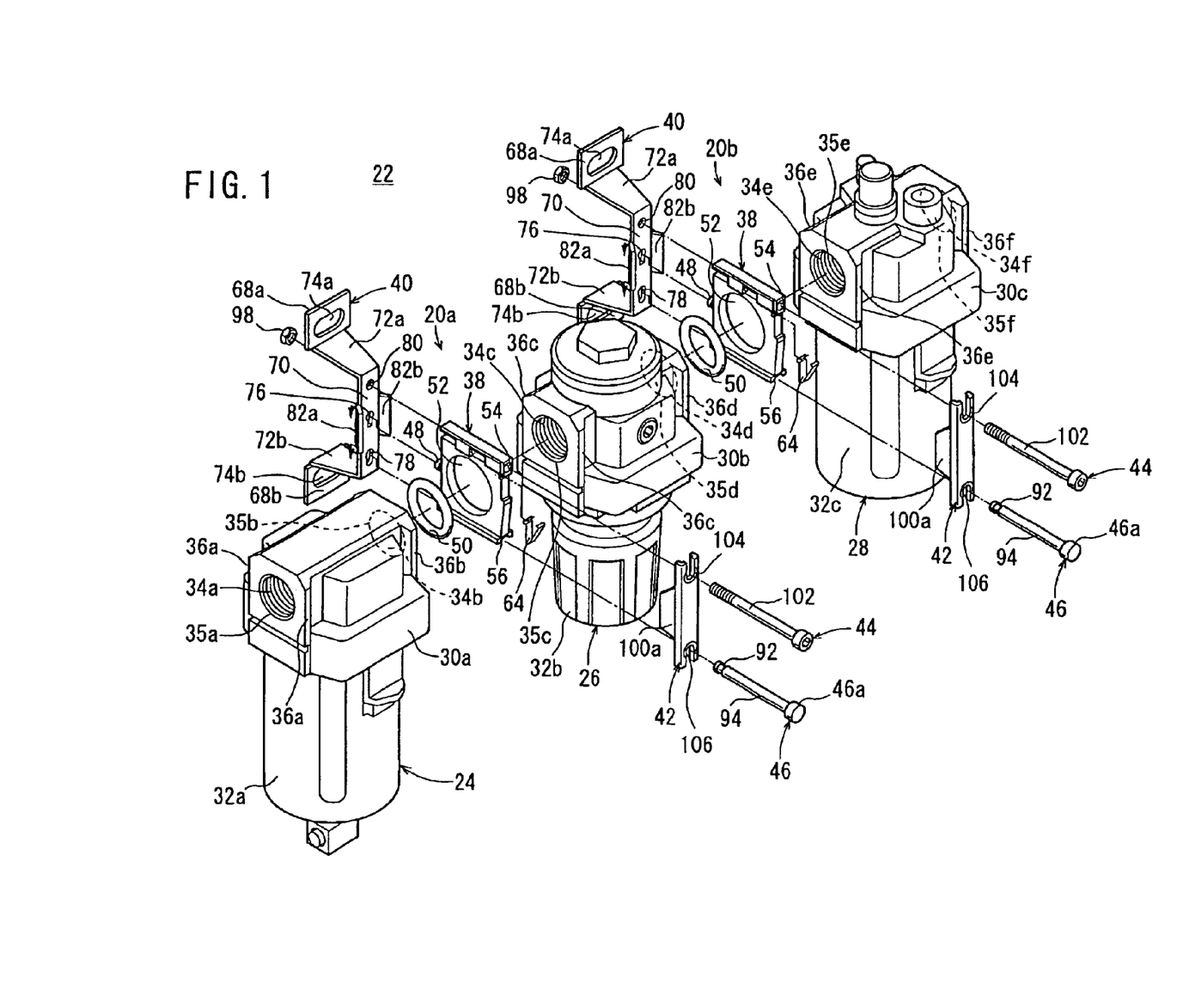
FIG. 1 is an exploded perspective view illustrating a fluid pressure-operated unit to which fluid pressure-operated apparatus-connecting devices according to an embodiment of the present invention are applied.

FIG. 1 shows a fluid pressure-operated unit 22 to which fluid pressure-operated apparatus-connecting devices 20a, 20b according to an embodiment of the present invention are applied. Each of the connecting devices 20a, 20b is composed of the same components. Therefore, explanation will be made below for one connecting device 20a. The components of the other connecting device 20b are designated by the same reference numerals, detailed explanation of which will be omitted.

The fluid pressure-operated unit 22 comprises a filter 24, a regulator 26, a lubricator 28, and the connecting devices 20a, 20b which are interposed between the respective fluid pressure-operated apparatuses (filter 24, regulator 26, and lubricator 28) and which connect the respective fluid pressure-operated apparatuses to one another.

Figure 9:
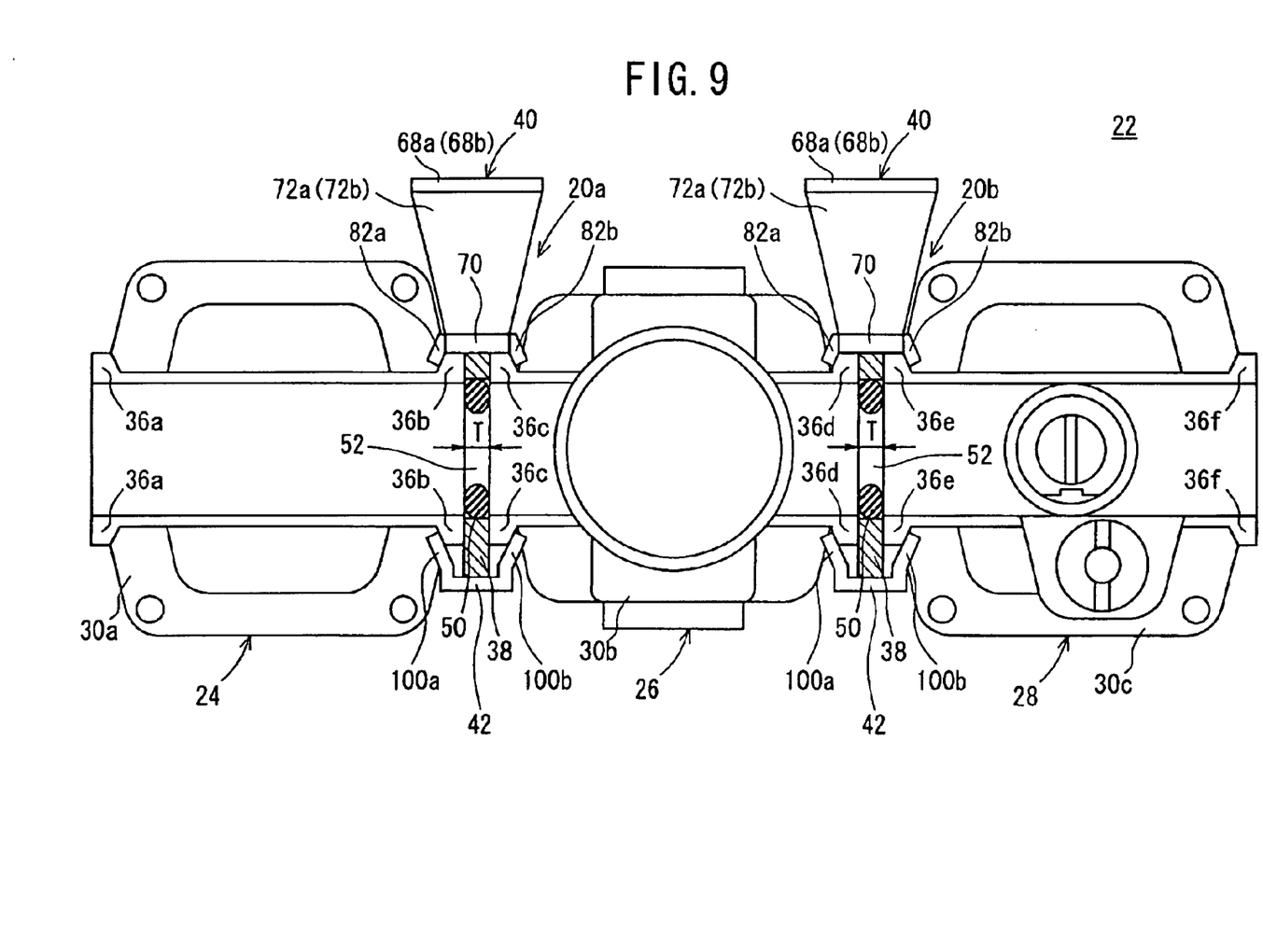
FIG. 9 is, with partial cross section, a plan view illustrating the fluid pressure-operated unit assembled by the connecting devices shown in FIG. 1.

Each of the fluid pressure-operated apparatuses (filter 24, regulator 26, and lubricator 28) is composed of a main body section 30a to 30c, a cover member 32a to 32c, ports 34a to 34f which are formed for the main body section 30a to 30c and into/from which a pressure fluid is introduced/discharged, annular grooves 35a to 35f which are formed at outer circumferences of the ports 34a to 34f, and pairs of engaging projections 36a to 36f which are formed mutually opposingly at outer edges of end surfaces at which the ports 34a to 34f are provided (see FIGS. 1 and 9).

Figure 3:
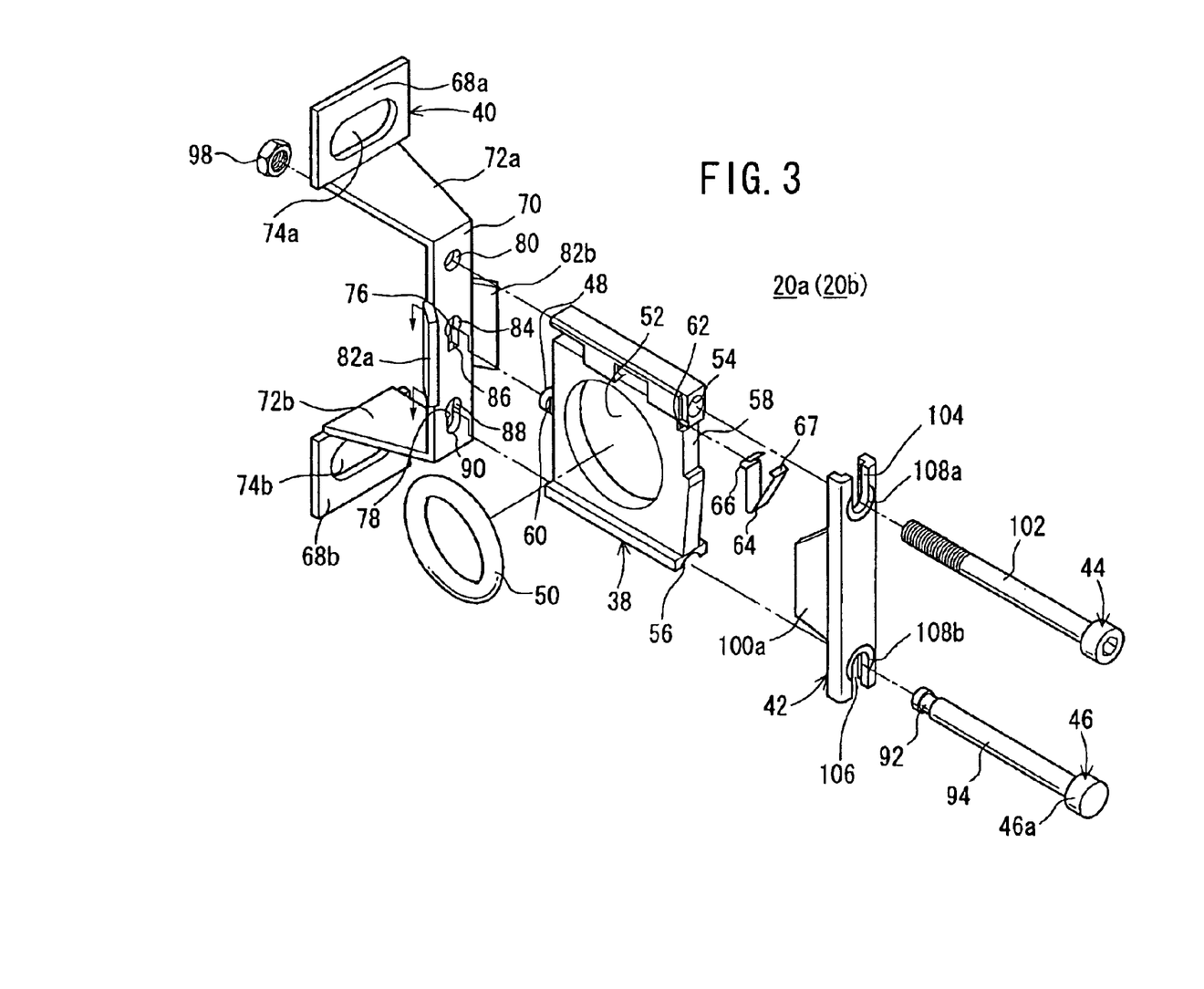
FIG. 3 is an exploded perspective view illustrating the connecting device shown in FIG. 1.

As shown in FIG. 3, the connecting device 20a comprises a body 38 which is formed to have a substantially square thin-walled planar configuration, a bracket 40 which is connected to one side surface having a narrow width of the body 38, a fastening member 42 which is installed to the other side surface having a narrow width of the body 38, a bolt (screw member) 44 which integrally connects the body 38, the bracket 40, and the fastening member 42, and a pin member 46 which fastens the fastening member 42 when the fluid pressure-operated apparatuses are connected to one another. The body 38 is thin-walled so that the size T (see FIG. 9) in the thickness direction of the body 38 is not more than about a half of the size G (see FIG. 10) in the thickness direction of the spacer 6 (see FIG. 10) having been hitherto interposed between the fluid pressure-operated apparatuses.

The body 38 comprises a cylindrical engaging pin 48 which protrudes on a central portion of one end surface to be connected to the bracket 40, a hole 52 which is formed at a central portion of the body 38 and to which one O-ring 50 is installed, a through-hole 54 into which the bolt 44 is inserted, a guide groove 56 which is formed on a side opposite to the through-hole 54 with respect to the center of the hole 52 and which is substantially parallel to the through-hole 54, and a recess 58 which is depressed by a predetermined length on a side of the other end surface to which the fastening member 42 is installed.

Figure 7:
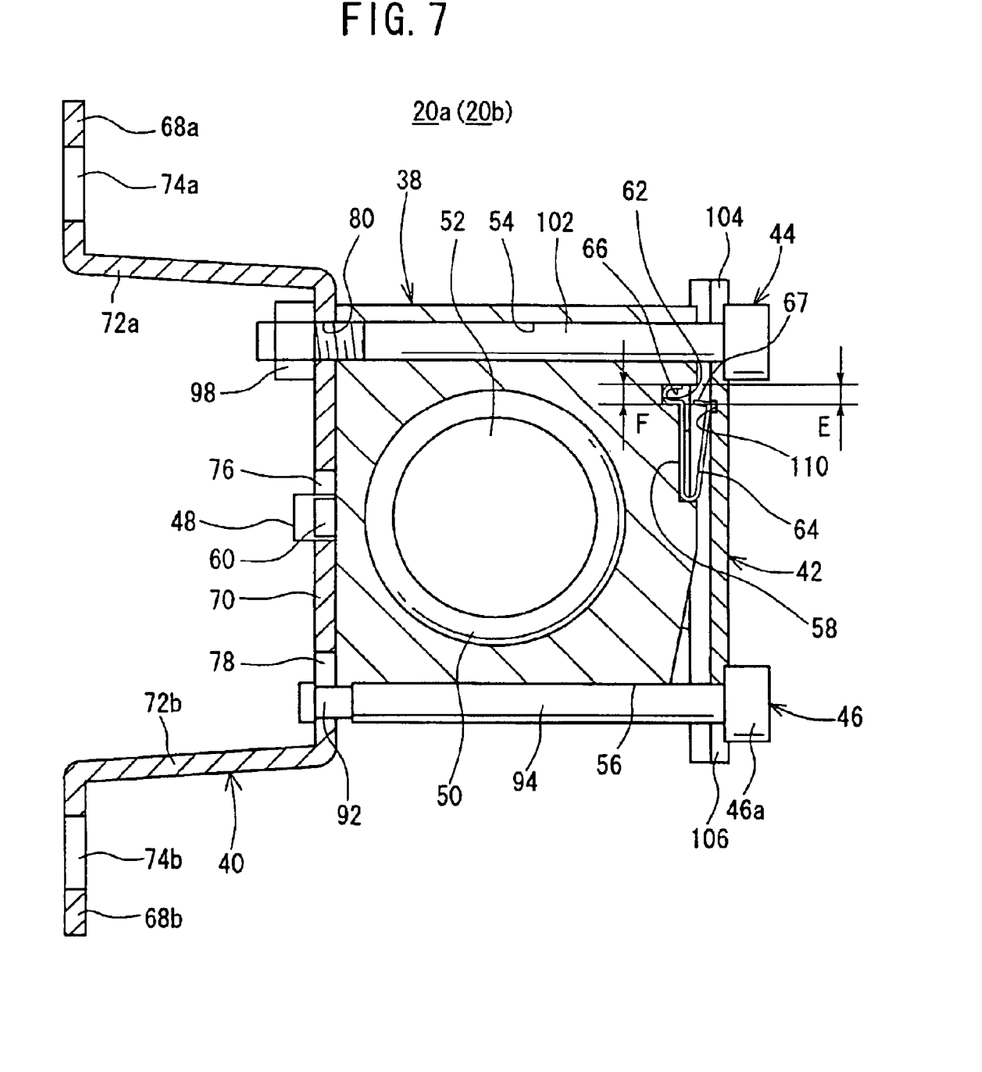
FIG. 7 is a vertical sectional view to illustrate the connecting action of the connecting device shown in FIG. 4.
Figure 8:
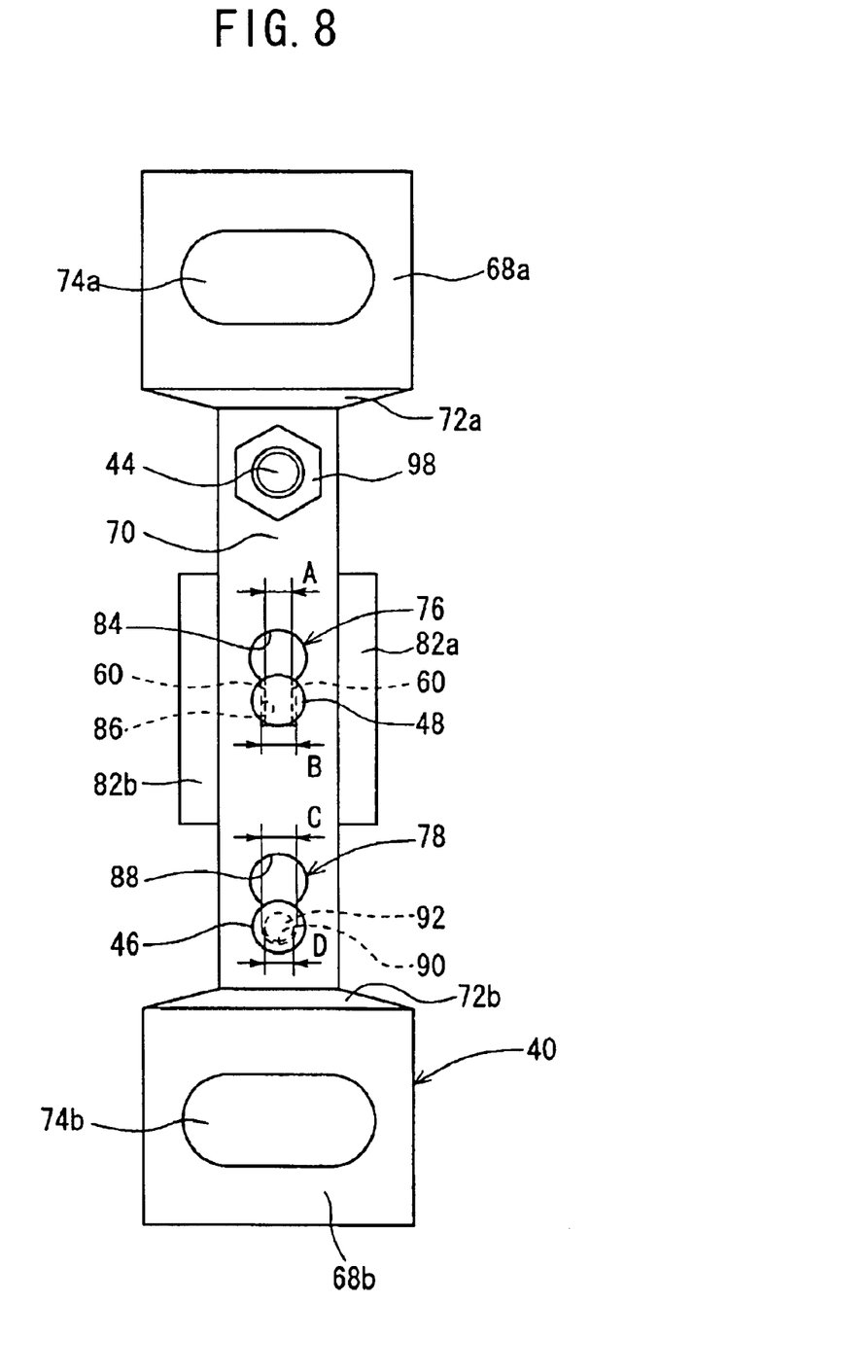
FIG. 8 is a front view illustrating an assembled state of a connecting section of the connecting device shown in FIG. 4.

As shown in FIG. 8, the engaging pin 48 has a pair of first cutouts 60 which are formed near the forward end to form a substantially rectangular cross section. The pair of mutually opposing first cutouts 60 are formed so that the separation size A, by which the pair of mutually opposing first cutouts 60 are separated from each other (see FIG. 8), is smaller than the diameter of the engaging pin 48. The first cutouts 60 have substantially the same height as the height of a first engaging groove 86 described later on when one end surface of the body 38 is allowed to abut against a connecting section 70 of the bracket 40 (see FIGS. 5 to 7).

As shown in FIG. 3, a diameter of the hole 52 is slightly smaller than the outer circumferential diameter of the O-ring 50 to be installed in the hole 52. As a result, when the one and the other fluid pressure-operated apparatuses are connected to the both sides of the connecting device 20a, the pressure fluid, which makes communication between the ports 34b, 34c via the hole 52, does not externally leak from the contact surface between the hole 52 and the outer circumferential surface of the O-ring 50.

The bolt 44 is inserted into the through-hole 54 in order to integrally fix the body 38, the bracket 40, and the fastening member 42. Further, the guide groove 56, which is cut out to have a semicircular cross section in order to suppress the size in the height direction, is formed to guide the pin member 46 in the axial direction of the body 38 when the pin member 46 is installed to the guide groove 56.

Figure 5:
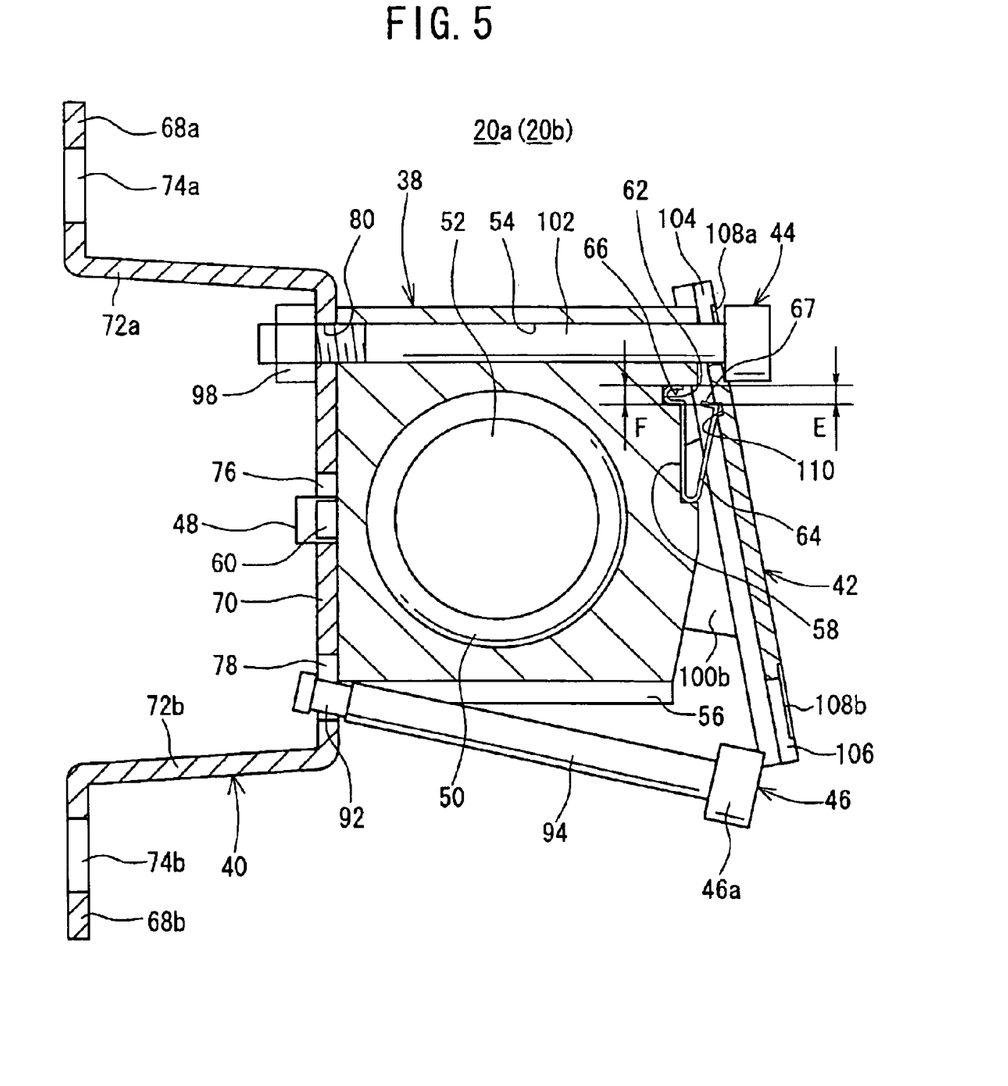
FIG. 5 is a vertical sectional view to illustrate the connecting action of the connecting device shown in FIG. 4.
Figure 6:
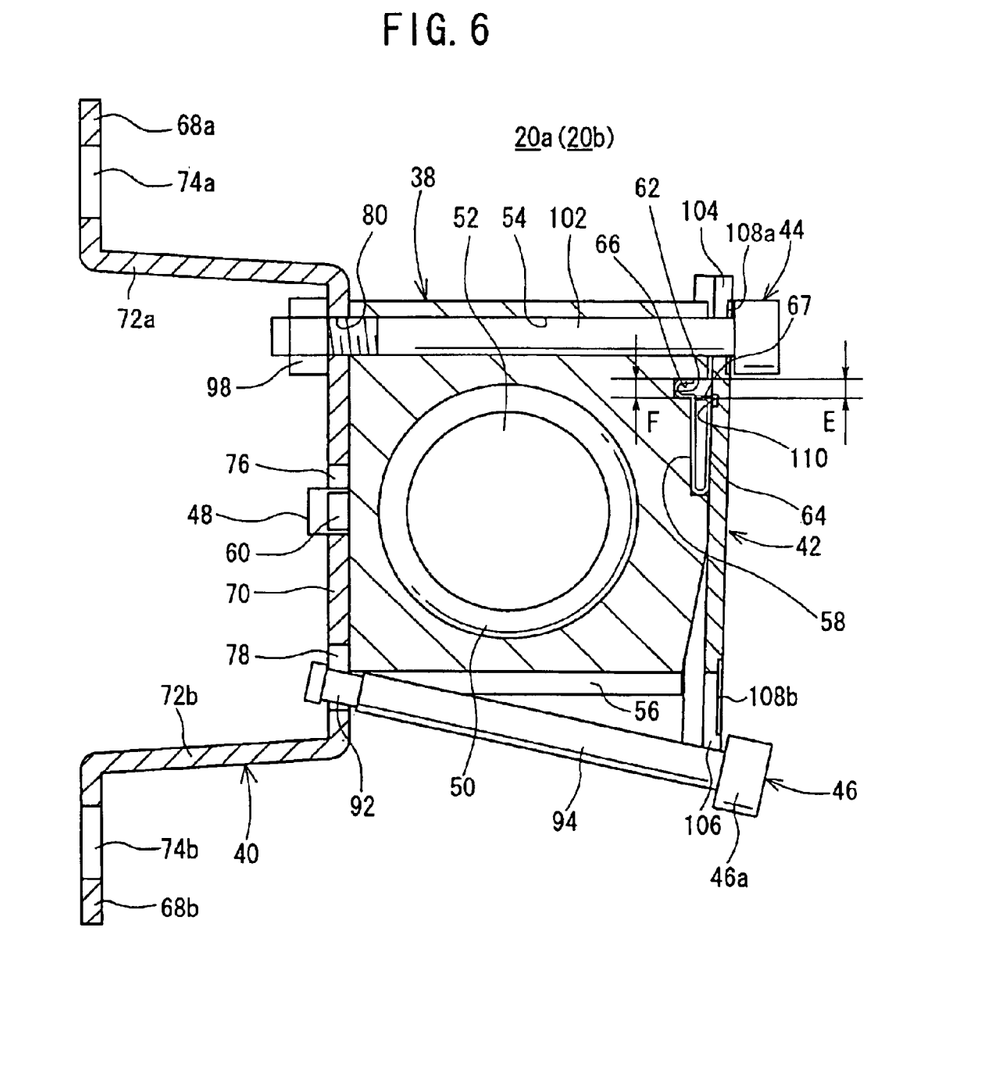
FIG. 6 is a vertical sectional view to illustrate the connecting action of the connecting device shown in FIG. 4.

The recess 58 is formed to have a substantially rectangular shape on the side of the through-hole 54 on the other end surface of the body 38 to which the fastening member 42 is installed. As shown in FIGS. 5 to 7, a groove 62, which is depressed by a predetermined length as compared with the recess 58, is formed in the recess 58 on the side of the through-hole 54. A plate spring (spring member) 64 is interposed between the recess 58 and the fastening member 42.

As shown in FIGS. 5 to 7, the plate spring 64 is formed such that a plate member is bent to have a substantially V-shaped cross section. A projection 66, which is formed by curving the plate member, is formed at one end. When the projection 66 is engaged with the groove 62 of the recess 58, the plate spring 64 is positioned. The projection 66 is formed to have its size E which is larger than the size F in the widthwise direction of the groove 62 (E>F). As a result, when the projection 66 is inserted into the groove 62, the projection 66 presses the wall surface of the groove 62 under the resilient action thereof. Therefore, the projection 66 is not disengaged from the groove 62. A bent section 67, which is bent at a right angle, is formed at the other end.

As shown in FIG. 3, the bracket 40 comprises a pair of flanges 68a, 68b which are formed to protrude outwardly on one side, the connecting section 70 which is formed on the other side on which the body 38 is connected, and a pair of legs 72a, 72b which connect the flanges 68a, 68b and the connecting section 70.

Slotted holes 74a, 74b are formed at central portions of the flanges 68a, 68b, with which the connecting device 20a can be fixed, for example, on an unillustrated installation place by the aid of unillustrated bolts or the like.

The pair of flanges 68a, 68b are formed on an identical plane (see FIGS. 5 to 7). Therefore, when the operation for connecting the three types of fluid pressure-operated apparatuses by using the connecting devices 20a, 20b, it is unnecessary for an operator to grip the connecting devices 20a, 20b. The connecting operation can be performed in a state in which the brackets 40 are allowed to stand on the plane.

As shown in FIG. 8, the connecting section 70 comprises a first engaging hole 76 which is formed at a central portion for making engagement with the engaging pin 48, a second engaging hole 78 which is separated by a predetermined spacing distance from the first engaging hole 76 for making engagement with the pin member 46, a screw hole 80 (see FIG. 3) which is separated by a predetermined spacing distance from the first engaging hole 76 and which is formed in a direction opposite to the second engaging hole 78, and a pair of first engaging flanges (first engaging sections) 82a, 82b (see FIG. 9) which are formed to have rectangular shapes while being inclined by predetermined angles on both sides at central portions.

The first engaging hole 76 is formed to have a keyhole-shaped configuration including a substantially circular portion and a substantially rectangular portion in combination, in which a circular first inserting hole 84 is formed on one side, and a rectangular first engaging groove 86, which has its size in the widthwise direction smaller than the diameter of the first inserting hole 84, is formed on the other side. The first engaging groove 86 is formed so that size B (see FIG. 8) in the widthwise direction of the first engaging groove 86 is substantially identical with or slightly larger than the separation size A (see FIG. 8) between the first cutouts 60 of the engaging pin 48.

The second engaging hole 78 is formed to have a keyhole-shaped configuration including a substantially circular portion and a substantially rectangular chamfered portion in combination, in which a circular second inserting hole 88 is formed on one side, and a second engaging groove 90, which is formed to have its size in the widthwise direction smaller than the diameter of the second inserting hole 88, is formed on the other side.

A substantially circular second cutout 92 is formed at a position separated by a predetermined spacing distance from the forward end of the pin member 46 (see FIG. 3). The second cutout 92 is formed to have its diameter which is smaller than the diameter of a shaft section 94 of the pin member 46.

The size C (see FIG. 8) in the widthwise direction of the second engaging groove 90 is substantially identical with or slightly larger than the size D (see FIG. 8) of the diameter of the second cutout 92 of the pin member 46.

That is, one end surface of the body 38 is allowed to abut against the connecting section 70 of the bracket 40, and the forward end of the engaging pin 48 is inserted into the first inserting hole 84. The engaging pin 48 is displaced substantially horizontally in a direction toward the first engaging groove 86 in a state in which the position in the height direction of the first engaging groove 86 is coincident with that of each of the first cutouts 60 of the engaging pin 48. As a result, the first cutouts 60 of the engaging pin 48 are engaged with the first engaging groove 86. Therefore, the body 38 is not separated from the bracket 40, and the body 38 does not rotate with respect to the bracket 40.

Further, the forward end of the pin member 46 is inserted into the second inserting hole 88 of the second engaging hole 78 to adjust the position in the height direction for the second engaging groove 90 and the second cutout 92 of the pin member 46. The second cutout 92 of the pin member 46 is displaced substantially horizontally in a direction toward the second engaging groove 90. As a result, the second cutout 92 of the pin member 46 is engaged with the second engaging groove 90. Therefore, the pin member 46 is prevented from disengagement in the axial direction of the pin member 46.

As shown in FIGS. 5 to 7, the bolt 44 is inserted into the screw hole 80 via the fastening member 42 and the through-hole 54 of the body 38. A nut 98 is screw-engaged with the bolt 44 protruding from the screw hole 80. Thus, the bracket 40, the fastening member 42, and the body 38 are integrally fixed.

The nut 98 is prevented from disengagement from the bolt 44 by deforming the shape of the nut 98 which is screw-engaged with the bolt 44 so that the nut 98 is secured to the bolt 44. The method for securing the nut 98 to the bolt 44 is not limited to the method for deforming the nut 98, for which any method is adoptable provided that the nut 98 can be secured to the bolt 44.

The first engaging flanges 82*a*, 82*b* (see FIG. 9) are formed on the both sides of the central portion of the connecting section 70 of the bracket 40 so that the first engaging flanges 82*a*, 82*b* are inclined by the predetermined angles in the directions away from the flanges 68*a*, 68*b*. As shown in FIG. 9, the first engaging flanges 82*a*, 82*b* are engaged with the engaging projections 36*a* to 36*f* disposed on one side of each of the fluid pressure-operated apparatuses respectively. The angles of inclination of the first engaging flanges 82*a*, 82*b* (see FIG. 9) correspond to the angles of inclination of the engaging projections 36*a* to 36*f*.

As shown in FIG. 3, the fastening member 42 comprises a pair of second engaging flanges (second engaging sections) 100*a*, 100*b* (see FIG. 9) which are formed to have rectangular shapes while being inclined by predetermined angles on both sides at central portions, a first cutout groove 104 which is formed at one end of the fastening member 42 and which has a half slotted hole-shaped configuration for making engagement with a shaft section 102 of the bolt 44, and a second cutout groove 106 which is formed at the other end and which has a half slotted hole-shaped configuration for making engagement with the shaft section 94 of the pin member 46. The first cutout groove 104 is formed so that the size in the widthwise direction of the first cutout groove 104 is slightly larger than the diameter of the shaft section 102 of the bolt 44. The second cutout groove 106 is formed so that the size in the widthwise direction of the second cutout groove 106 is slightly larger than the diameter of the pin member 46.

Circular recesses 108*a*, 108*b*, with which a head of the bolt 44 and a head 46*a* of the pin member 46 are engaged respectively, are formed at ends of the first cutout groove 104 and the second cutout groove 106.

That is, when the connecting device 20*a* is assembled to the fluid pressure-operated apparatuses, the head of the bolt 44 and the head 46*a* of the pin member 46 are engaged with the recesses 108*a*, 108*b*. Accordingly, the bolt 44 and the pin member 46 are prevented from disengagement from the first cutout groove 104 and the second cutout groove 106 of the fastening member 42.

As shown in FIG. 9, the second engaging flanges 100*a*, 100*b* are formed so that they are inclined by the predetermined angles in the direction toward the body 38 on the both sides at the central portions of the fastening member 42. When the second engaging flanges 100*a*, 100*b* are pressed so that they are substantially horizontal against the spring force of the plate spring 64, the second engaging flanges 100*a*, 100*b* are engaged with the engaging projections 36*a* to 36*f* disposed on the other side of each of the fluid pressure-operated apparatuses. The angles of inclination of the second engaging flanges 100*a*, 100*b* correspond to the angles of inclination of the engaging projections 36*a* to 36*f*.

An engaging recess 110, which is depressed by a predetermined length, is formed at a position at which the bent section 67 of the plate spring 64 makes abutment when the fastening member 42 is pressed so that the fastening member 42 is inclined by a predetermined angle under the action of the spring force of the plate spring 64. That is, the bent section 67 is engaged with the engaging recess 110 in a state in which the bent section 67 is pressed upwardly. Thus, the fastening member 42 is prevented from disengagement from the bolt 44 with which the fastening member 42 is engaged. When the fastening member 42 is pressed downwardly when the fluid pressure-operated apparatuses are connected, then the bent section 67 is disengaged from the engaging recess 110 in a direction toward the first cutout groove 104, and the bent section 67 is pressed in a direction toward the body 38.

Each of the connecting devices 20*a*, 20*b* for the fluid pressure-operated apparatuses according to the embodiment of the present invention is basically constructed as described above. Next, its operation, function, and effect will be explained. At first, the operation for assembling the connecting device 20*a* will be explained.

As shown in FIG. 3, the O-ring 50 is installed to the hole 52 of the body 38, and the engaging pin 48 of the body 38 is inserted into the first inserting hole 84 of the first engaging hole 76 of the bracket 40. In this procedure, the components are assembled so that the through-hole 54 of the body 38 is disposed on the side of the screw hole 80 of the bracket 40.

Subsequently, the engaging pin 48 is displaced substantially horizontally in the direction toward the first engaging groove 86 of the first engaging hole 76. Accordingly, the first cutouts 60 of the engaging pin 48 are engaged with the first engaging groove 86.

Subsequently, the plate spring 64 is installed to the recess 58 of the body 38. The projection 66 of the plate spring 64 is inserted into the groove 62 to position the plate spring 64.

Subsequently, the fastening member 42 is installed to the other end of the body 38 to interpose the plate spring 64 in a state in which the bent section 67 of the plate spring 64 is engaged with the engaging recess 110. The bolt 44 is inserted into the through-hole 54 and the screw hole 80 of the bracket 40 via the first cutout groove 104 of the fastening member 42. The distance between the head of the bolt 44 and the nut 98 is adjusted so that the fastening member 42 has a little clearance from the other end surface of the body 38 to secure the nut 98 and effect fixation thereby. The distance between the head of the bolt 44 and the nut 98 is set to such a length that the fastening member 42 is substantially horizontal when the fastening member 42 is fastened by the pin member 46, and the first engaging flanges 82a, 82b and the second engaging flanges 100a, 100b can be reliably engaged with the engaging projections 36a to 36f.

Finally, the pin member 46 is inserted into the second inserting hole 88 of the bracket 40 via the second cutout groove 106 of the fastening member 42. Accordingly, the second cutout 92 of the pin member 46 is engaged with the second engaging groove 90 (see FIG. 4).

Figure 4:
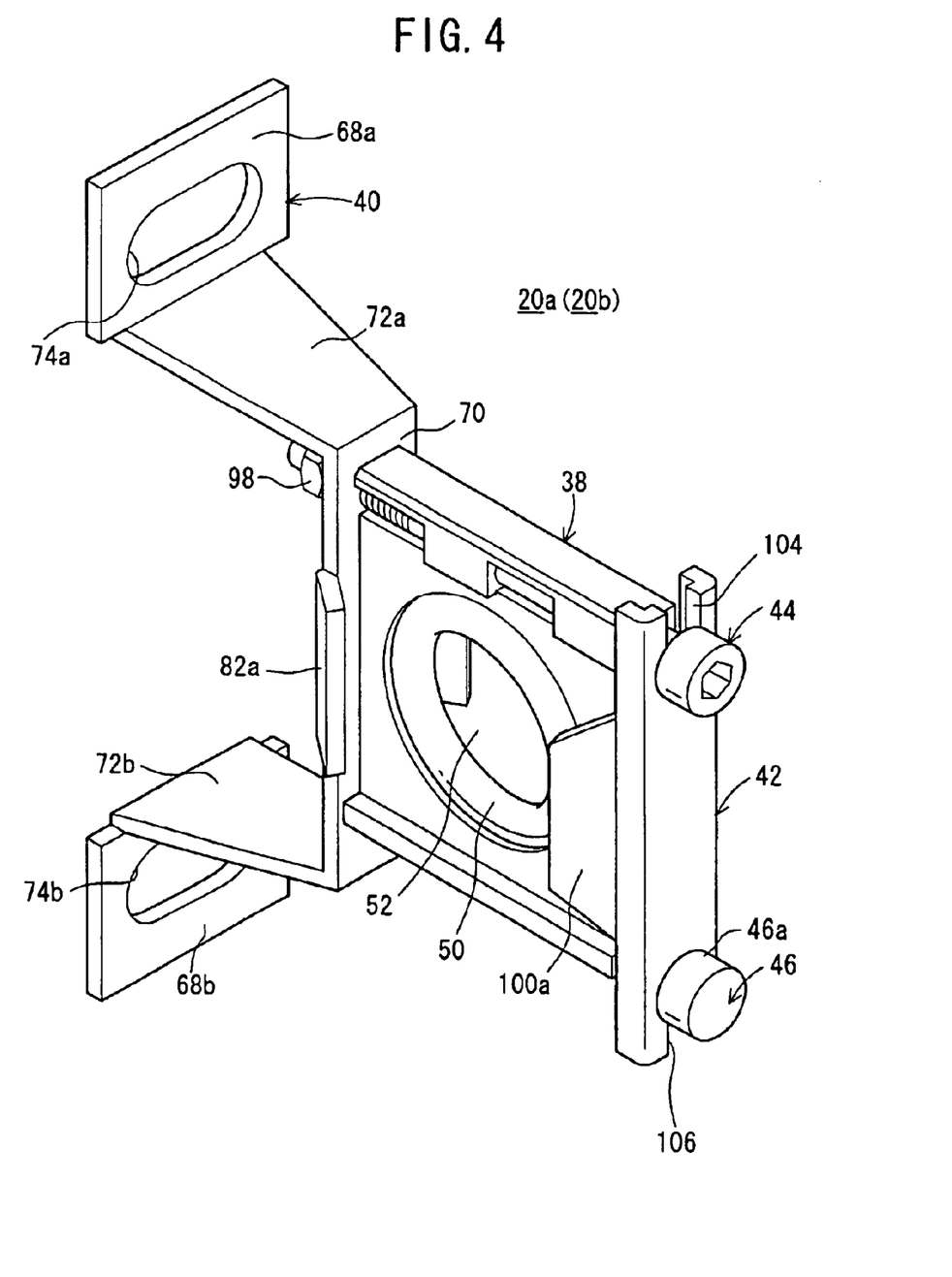
FIG. 4 is a magnified perspective view illustrating an assembled state of the connecting device shown in FIG. 3.

In this situation, the fastening member 42 is pressed upwardly under the action of the spring force of the plate spring 64. Therefore, the upper surface of the fastening member 42 is pressed by the head of the bolt 44 and the head 46a of the pin member 46 to make abutment.

When the pin member 46, which has been engaged with the second engaging groove 90, is tilted by a predetermined angle about the support point of the second cutout 92 in a direction away from the body 38, the fastening member 42 is released from the fastened state having been effected by the pin member 46. The fastening member 42 is pressed upwardly about the support point of the portion of the head of the bolt 44 under the action of the spring force of the plate spring 64, because of the clearance provided between the body 38 and the bolt 44 (see FIG. 5).

Next, explanation will be made for the connection between the connecting device 20a assembled as described above and the fluid pressure-operated apparatuses. The order of assembling the filter 24, the regulator 26, and the lubricator 28 is not limited to the order referred to in this description.

The flanges 68a, 68b of the bracket 40 are placed on an unillustrated planar floor or the like to allow the connecting device 20a to stand on the plane. That is, it is unnecessary for an operator to grip the connecting device 20a, because the connecting device 20a can stand on the plane stably and reliably.

Subsequently, as shown in FIG. 5, the pin member 46 is tilted by a predetermined angle in a direction away from the body 38 about the support point of the engaged portion between the second cutout 92 and the second engaging groove 90, starting from the second cutout groove 106 of the fastening member 42 to give a state in which the fastening member 42 is pushed upwardly while being inclined by a predetermined angle in the upward direction about the support point of the portion of the first engaging groove 86 engaged with the bolt 44 under the action of the spring force of the plate spring 64.

Subsequently, the engaging projection 36b (see FIG. 1), which is formed at the lower position on one end side formed with the port 34b (see FIG. 1) of one fluid pressure-operated apparatus (for example, filter 24) to be connected, is engaged at the upper position with the first engaging flange 82a, 82b (see FIG. 9) of the bracket 40, and the annular groove 35b (see FIG. 1), which is formed at the outer circumference of the port 34b (see FIG. 1), is allowed to abut against the O-ring 50 installed to the hole 52. The operation is performed in the same manner as described above on the opposite side of the connecting device 20a. That is, the engaging projection 36c (see FIG. 1) of the other fluid pressure-operated apparatus (for example, regulator 26) is engaged with the first engaging flange 82a, 82b (see FIG. 9), and the annular groove 35c (see FIG. 1), which is formed at the outer circumference of the port 34c (see FIG. 1), is allowed to abut against the O-ring 50 installed to the hole 52.

Subsequently, as shown in FIG. 6, the fastening member 42, which has been inclined by the predetermined angle, is pressed downwardly so that the fastening member 42 is displaced in the downward direction against the spring force of the plate spring 64 to give a substantially horizontal state. As a result, the engaging projections 36b, 36c (see FIG. 1), which are formed at the positions over the ports 34b, 34c (see FIG. 1) of the respective fluid pressure-operated apparatuses, are engaged with the second engaging flanges 100a, 100b (see FIG. 9) of the fastening member 42 in this state.

Finally, as shown in FIG. 7, the pin member 46 is tilted by a predetermined angle in a direction toward the second cutout groove 106 of the fastening member 42 about the support point of the engaged portion between the second cutout 92 and the second engaging groove 90. Further, the shaft section 94 of the pin member 46 is engaged with the second cutout groove 106, and the head 46a of the pin member 46 is engaged with the recess 108b. Accordingly, the fastening member 42 is fastened in a substantially horizontal state. As a result, the fluid pressure-operated apparatuses, which are arranged on the both sides of the connecting device 20a, are integrally connected by the connecting device 20a. Further, the port 34b and the port 34c of the fluid pressure-operated apparatuses are communicated with each other via the hole 52 of the connecting device 20a. In this situation, the space between the ports 34b, 34c of the fluid pressure-operated apparatuses is kept airtight, because the single O-ring 50 is installed to the hole 52.

The remaining one fluid pressure-operated apparatus (for example, lubricator 28) is connected in the same manner as described above. Thus, the three types of fluid pressure-operated apparatuses (filter 24, regulator 26, and lubricator 28) are connected in parallel in an integrated manner.

As described above, in the embodiment of the present invention, the connecting devices 20a, 20b can stand on the plane for performing the assembling operation by the aid of the flanges 68a, 68b of the bracket 40. Therefore, the operator can perform the assembling operation with both hands without gripping the connecting devices 20a, 20b. Thus, it is possible to improve the operation efficiency.

When the respective fluid pressure-operated apparatuses (filter 24, regulator 26, and lubricator 28) are connected to one another, the connecting operation can be performed conveniently by engaging the pin member 46 with the second cutout groove 106 of the fastening member 42. Thus, it is possible to improve the operation efficiency.

Figure 2:
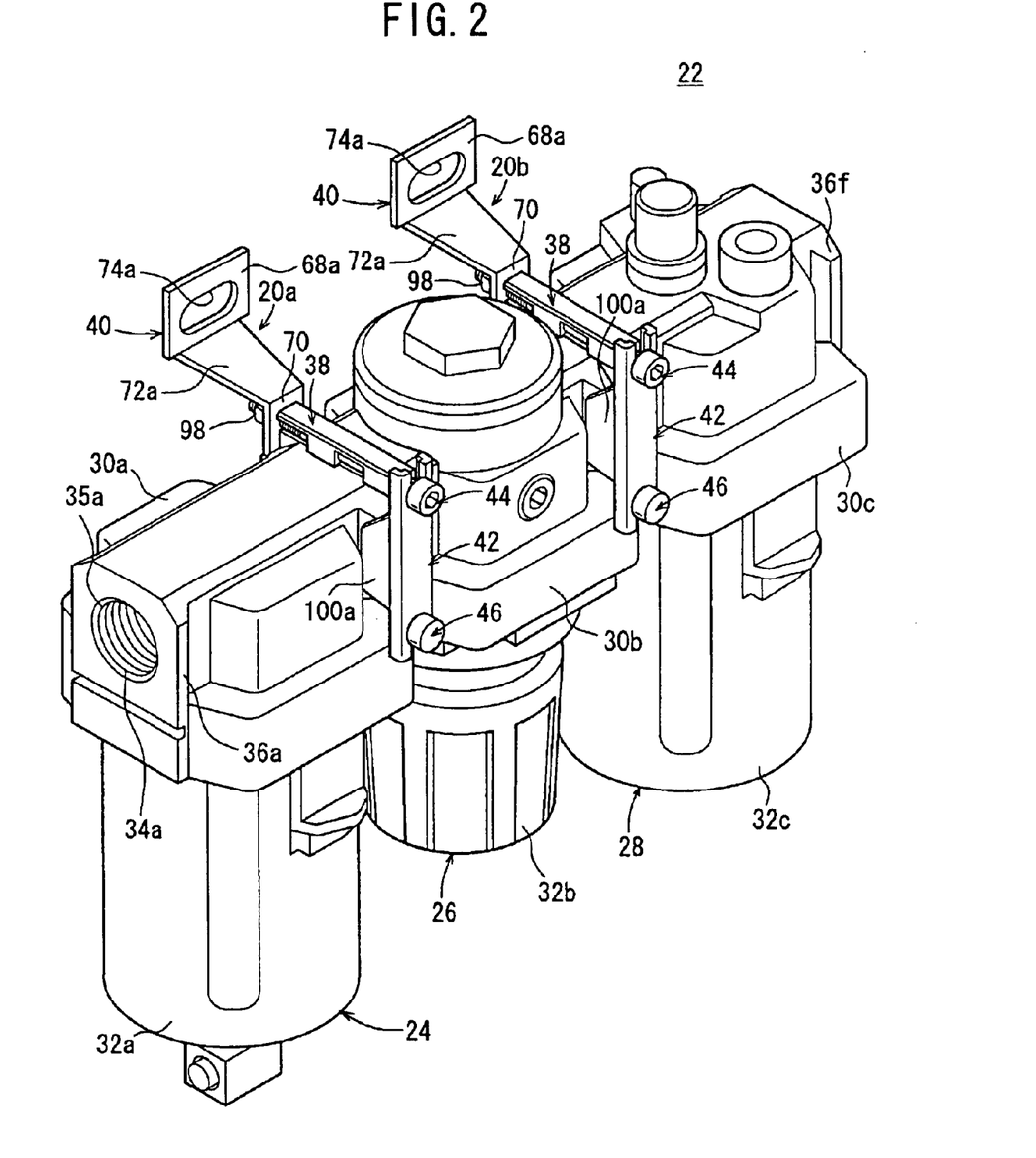
FIG. 2 is a perspective view illustrating a state in which a plurality of fluid pressure-operated apparatuses are assembled by the aid of the connecting devices shown in FIG. 1.

In the fluid pressure-operated unit 22 to which the connecting devices 20a, 20b assembled as described above are adapted, as shown in FIG. 2, the pressure fluid, which is supplied from an unillustrated pressure fluid supply source, is introduced via an unillustrated tube into the filter 24 from the port 34a of the filter 24. The pressure fluid, from which any dust has been removed by an unillustrated dust-removing means in the filter 24, is introduced from the port 34c (see FIG. 1) into the regulator 26 integrally connected by the connecting device 20a. During this process, the pressure fluid does not externally leak from the space between the ports 34b, 34c of the one and the other fluid pressure-operated apparatuses connected on the both sides of the connecting device 20a, owing to the O-ring 50 (see FIG. 1) installed to the connecting device 20a.

The pressure fluid, which has been introduced into the regulator 26, is adjusted to have a preset pressure value, and the adjusted pressure fluid is introduced via the port 34e (see FIG. 1) into the lubricator 28 integrally connected by the connecting device 20b.

The pressure fluid, which has been introduced into the lubricator 28, is allowed to be in a state in which an appropriate amount of lubricating oil is contained in the pressure fluid, and the pressure fluid is derived from the port 34f (see FIG. 1) via an unillustrated tube to a fluid pressure-operated apparatus which requires lubrication.

As described above, according to the embodiment of the present invention, the brackets 40 of the connecting devices 20a, 20b can stand on the plane for performing the operation. Therefore, the operator can efficiently perform the connecting operation with both hands without gripping the connecting devices 20a, 20b.

The fluid pressure-operated apparatuses can be connected by performing only the convenient operation such that the engaging projections 36b to 36e of the fluid pressure-operated apparatuses are engaged with the first engaging flanges 82a, 82b and the second engaging flanges 100a, 100b (see FIG. 9), and the fastening members 42 are fastened by the pin members 46. Therefore, it is possible to further improve the operation efficiency.

The size in the widthwise direction of the body 38 interposed between the respective fluid pressure-operated apparatuses can be thin-walled (to be about not more than a half of the size in the widthwise direction of the spacer 6) as compared with the conventional spacer 6 (see FIG. 10). Therefore, it is possible to decrease the size in the widthwise direction of the connecting device 20a, 20b, and it is possible to miniaturize the size in the widthwise direction of the entire fluid pressure-operated unit 22.

As a result of the realization of the thin-walled size in the widthwise direction of the body 38, the number of parts can be reduced, i.e., from the conventional two pieces to one piece for the O-ring 50 installed at the inside. Therefore, it is possible to reduce the cost owing to the reduction of the number of parts.

What is claimed is:

1. A fluid pressure-operated apparatus-connecting device disposed between one and the other fluid pressure-operated apparatuses for integrally connecting said fluid pressure-operated apparatuses to one another so that respective fluid passages of said one and the other fluid pressure-operated apparatuses may be communicated with each other, said fluid pressure-operated apparatus-connecting device comprising:

a body which is formed with a hole for mutually communicating said respective fluid passages of said one and the other fluid pressure-operated apparatuses;

a bracket which is connected to one end surface of said body and which is formed with first engaging sections for making engagement with first projections provided for said one and the other fluid pressure-operated apparatuses respectively;

a fastening member which is installed to the other end surface of said body, which has second engaging sections for making engagement with second projections provided for said one and the other fluid pressure-operated apparatuses respectively, and which is formed with cutout grooves;

a spring member which is interposed between said body and said fastening member for urging one end of said fastening member in a direction away from said body;

a pin member which has one end that is engageable with said bracket and which has the other end that is detachable with respect to said cutout groove of said fastening member; and a screw member which fastens said body, said bracket, and said fastening member in an integrated manner.

2. The fluid pressure-operated apparatus-connecting device according to claim 1, wherein said pin member is inserted into said cutout groove to fasten said fastening member against spring force of said spring member, and thus said first and second engaging sections are engaged with said first and second projections of said one and the other fluid pressure-operated apparatuses respectively.

3. The fluid pressure-operated apparatus-connecting device according to claim 1, wherein a single seal member is provided for said hole along an inner wall surface of said hole.

4. The fluid pressure-operated apparatus-connecting device according to claim 1, wherein a pair of flanges, each of which has a substantially planar configuration, are provided for said bracket.

5. The fluid pressure-operated apparatus-connecting device according to claim 1, wherein said spring member is provided with a projection which is inserted into a groove of said body.

6. The fluid pressure-operated apparatus-connecting device according to claim 1, wherein said fastening member is provided with an engaging recess which is formed on a side surface for making abutment against said spring member and with which a bent section of said spring member is engageable.

7. The fluid pressure-operated apparatus-connecting device according to claim 6, wherein said bent section of said spring member can be inserted into said engaging recess when one end of said fastening member is separated from said body by spring force of said spring member.

8. The fluid pressure-operated apparatus-connecting device according to claim 1, wherein said body is provided with an engaging pin which protrudes outwardly, and said engaging pin is inserted into a first engaging hole formed for said bracket.

9. The fluid pressure-operated apparatus-connecting device according to claim 8, wherein said engaging pin is formed with a first cutout which is fastened to said first engaging hole.

10. The fluid pressure-operated apparatus-connecting device according to claim 9, wherein said first engaging hole is provided with a first engaging groove which is engaged with said first cutout.

11. The fluid pressure-operated apparatus-connecting device according to claim 1, wherein said bracket is formed with a second engaging hole into which one end of said pin member is inserted.

12. The fluid pressure-operated apparatus-connecting device according to claim 11, wherein said second engaging hole is provided with a second engaging groove to which said one end of said pin member is fastened.

13. The fluid pressure-operated apparatus-connecting device according to claim 12, wherein a second cutout, which has a shape corresponding to said second engaging groove, is formed at said one end of said pin member.

14. The fluid pressure-operated apparatus-connecting device according to claim 13, wherein said pin member is provided tiltably about a support point of said second cutout engaged with said second engaging groove.

15. The fluid pressure-operated apparatus-connecting device according to claim 2, wherein said pin member is engageable with said cutout groove against said spring force of said spring member under a tilting action about a support point of said one end.

* * * * *